United States Patent
Shome et al.

(10) Patent No.: US 9,120,554 B2
(45) Date of Patent: Sep. 1, 2015

(54) VARIABLE CAMBER FLUID-DYNAMIC BODY UTILIZING OPTIMIZED SMART MATERIALS

(75) Inventors: Moushumi Shome, Kent, WA (US); Frederick T. Calkins, Renton, WA (US); James Henry Mabe, Seattle, WA (US); Matthew Todd Grimshaw, Seattle, WA (US)

(73) Assignee: The Boeing Company, Chicago, IL (US)

( * ) Notice: Subject to any disclaimer, the term of this patent is extended or adjusted under 35 U.S.C. 154(b) by 105 days.

(21) Appl. No.: 13/210,375

(22) Filed: Aug. 16, 2011

(65) Prior Publication Data

US 2013/0043354 A1 Feb. 21, 2013

(51) Int. Cl.
*B64C 3/48* (2006.01)
*B64C 3/44* (2006.01)

(52) U.S. Cl.
CPC ............. *B64C 3/48* (2013.01); *B64C 2003/445* (2013.01); *Y10T 29/49826* (2015.01)

(58) Field of Classification Search
CPC ................ B64C 3/48; B64C 2003/445; Y10T 29/49826; Y02T 50/145
USPC ............. 244/123.11, 200, 201, 214, 215, 219
See application file for complete search history.

(56) References Cited

U.S. PATENT DOCUMENTS

| | | | |
|---|---|---|---|
| 5,114,104 A | 5/1992 | Cincotta et al. | |
| 6,164,599 A * | 12/2000 | Piening et al. | 244/215 |
| 7,641,152 B2 | 1/2010 | Onu | |
| 8,256,719 B2 * | 9/2012 | Wood et al. | 244/200 |
| 8,366,057 B2 * | 2/2013 | Vos et al. | 244/219 |
| 2002/0195177 A1 * | 12/2002 | Hinkley et al. | 148/559 |
| 2005/0099261 A1 | 5/2005 | Walak | |
| 2007/0200656 A1 | 8/2007 | Walak | |
| 2009/0283936 A1 * | 11/2009 | Sanderson et al. | 264/413 |
| 2010/0127504 A1 * | 5/2010 | Hancock | 290/55 |
| 2010/0133387 A1 * | 6/2010 | Wood et al. | 244/219 |
| 2011/0116927 A1 * | 5/2011 | Hancock et al. | 416/23 |

FOREIGN PATENT DOCUMENTS

| | | |
|---|---|---|
| DE | 4113504 A1 | 11/1992 |
| EP | 2078865 A2 | 7/2009 |
| FR | 2927377 A1 | 8/2009 |

OTHER PUBLICATIONS

"Batman: Yesterday, Today, and Beyond", Jul. 5, 2008, www.batmanytb.com, http://web.archive.org/web/20080705091820/http://www.batmanytb.com/movies/thedarkknight/gadgets/batsuit.php.*

Hartl, D.J., Lagoudas, D.C., "Characterization and 3-D Modeling of Ni60Ti SMA for Actuation of a Variable Geometry Jet Engine Chevron," Proc. of SPIE vol. 6529 65293Z-1; 2007.

(Continued)

*Primary Examiner* — Valentina Xavier (74) *Attorney, Agent, or Firm* — McDonnell Boehnen Hulbert & Berghoff LLP (57) ABSTRACT

A system and methods for configuring a fluid-dynamic body is disclosed. A camber of a fluid-dynamic body is configured by activating a shape memory alloy actuator coupled to the fluid-dynamic body.

20 Claims, 7 Drawing Sheets

(56) References Cited

OTHER PUBLICATIONS

Hartl, D.J., Mooney, J.T., Lagoudas, D.C., Mabe, J.H., Calkins, F.T., "Experimentally Validated Numerical Analysis of Aerostructures Incorporating Shape Memory Alloys," Proc. of SPIE vol. 6929 692913-1; 2008.

EP 12180290.4 European Search Report and European Search Opinion of the European Patent Office, Jan. 30, 2013; and References.

* cited by examiner

VARIABLE CAMBER FLUID-DYNAMIC BODY UTILIZING OPTIMIZED SMART MATERIALS

FIELD

Embodiments of the present disclosure relate generally to fluid-dynamic design. More particularly, embodiments of the present disclosure relate to design of fluid-dynamic control surfaces.

BACKGROUND

In aeronautics and aeronautical engineering, camber comprises an asymmetry between an upper surface and a lower surface of an airfoil. A camber of an airfoil can be defined by a camber line, which is the curve that is halfway between the upper surface and the lower surface of the airfoil. Camber is generally an important contributing factor determining a stall speed of an aircraft. A change in a camber of an airfoil can change a stall speed of an aircraft.

SUMMARY

A system and methods for configuring a fluid-dynamic body is disclosed. A fluid-dynamic body is shaped into a first camber configuration, and the fluid-dynamic body is shaped into a second camber configuration using a shape memory alloy actuator.

In an embodiment, a method for configuring a fluid-dynamic body configures a camber of a fluid-dynamic body by activating a shape memory alloy actuator coupled to the fluid-dynamic body.

In another embodiment, a variable camber fluid-dynamic body system comprises a fluid-dynamic body and a shape memory alloy actuator. The fluid-dynamic body is operable to assume a first camber configuration and a second camber configuration. The shape memory alloy actuator is operable to configure the fluid-dynamic body into the first camber configuration in response to a first control temperature. The shape memory alloy actuator is further operable to configure the fluid-dynamic body into the second camber configuration in response to a second control temperature.

In yet another embodiment, a method for providing a variable camber fluid-dynamic body system provides a fluid-dynamic body operable to assume a first camber configuration and a second camber configuration, and couples a shape memory alloy actuator to the fluid-dynamic body. The shape memory alloy actuator is operable to configure the fluid-dynamic body into the first camber configuration in response to a first control temperature, and configure the fluid-dynamic body into the second camber configuration in response to a second control temperature.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aerodynamics, shape memory alloys, vehicle structures, fluid dynamics, flight control systems, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, an aircraft airfoil. Embodiments of the disclosure, however, are not limited to such aircraft airfoil applications, and the techniques described herein may also be utilized in other applications. For example but without limitation, embodiments may be applicable to hydrofoils, wind turbines, tidal power turbines, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
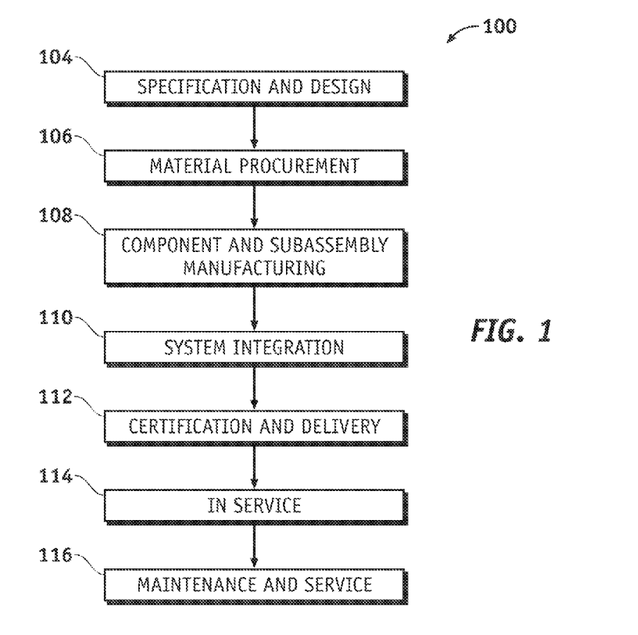
FIG. 1 is an illustration of a flow diagram of an exemplary aircraft production and service methodology.
Figure 2:
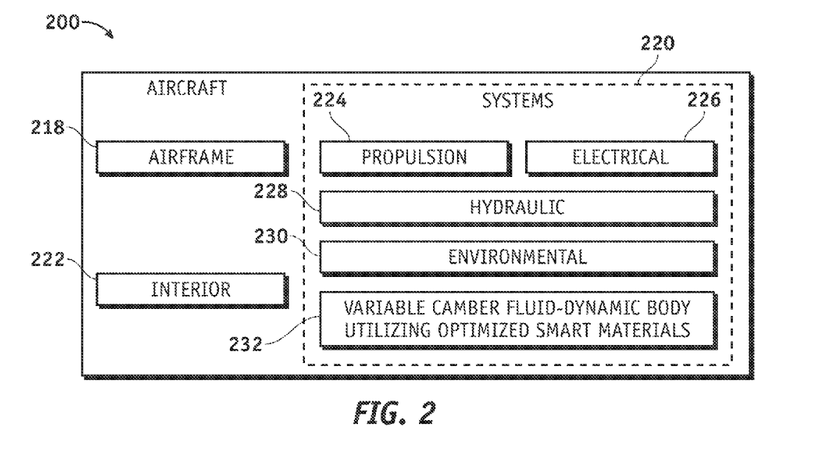
FIG. 2 is an illustration of an exemplary block diagram of an aircraft.

Referring more particularly to the drawings, embodiments of the disclosure may be described in the context of an exemplary aircraft manufacturing and service method 100 (method 100) as shown in FIG. 1 and an aircraft 200 as shown in FIG. 2. During pre-production, the method 100 may comprise specification and design 104 of the aircraft 200, and material procurement 106. During production, component and subassembly manufacturing 108 (process 108) and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also comprise modification, reconfiguration, refurbishment, and so on).

Each of the processes of method 100 may be performed or carried out by a system integrator, a third party, and/or an operator (e.g., a customer). For the purposes of this description, a system integrator may comprise, for example but without limitation, any number of aircraft manufacturers and major-system subcontractors; a third party may comprise, for example but without limitation, any number of vendors, subcontractors, and suppliers; and an operator may comprise, for example but without limitation, an airline, leasing company, military entity, service organization; and the like.

As shown in FIG. 1, the aircraft 200 produced by the method 100 may comprise an airframe 218 with a plurality of systems 220 and an interior 222. Examples of high-level systems of the systems 220 comprise one or more of a propulsion system 224, an electrical system 226, a hydraulic system 228, an environmental system 230, and a variable camber fluid dynamic body utilizing optimized smart materials system 232. Any number of other systems may also be included. Although an aerospace example is shown, the embodiments of the disclosure may be applied to other industries.

Apparatus and methods embodied herein may be employed during any one or more of the stages of the method 100. For example, components or subassemblies corresponding to production of the process 108 may be fabricated or manufactured in a manner similar to components or subassemblies produced while the aircraft 200 is in service. In addition, one or more apparatus embodiments, method embodiments, or a combination thereof may be utilized during production stages of the process 108 and the system integration 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

A shape memory alloy (SMA) remembers its original shape after being deformed from that original shape. An SMA returns to its original shape when it is heated (shape memory effect) or when the deforming pressure is removed (superelasticity). An SMA that returns to its original shape when heated is a one-way SMA. A two-way SMA remembers two different shapes: one shape at a relative low temperature, and another shape at a relative high temperature. Setting the two shapes by thermo-mechanical processing is known as "training" the SMA. An SMA with the two shapes set is known as a "trained" SMA. The shape properties of a trained SMA result from a temperature initiated martensitic phase transformation from a low symmetry (martensite) to a highly symmetric (austenite) crystal structure.

The temperatures at which the SMA changes its structure depend on a particular alloy, and can be tuned by varying a chemical mix and thermo-mechanical processing. Some common SMA materials may comprise, for example but without limitation, copper-zinc-aluminum, copper-aluminum-nickel, nickel-titanium-platinum, nickel-titanium-palladium, nickel-titanium-hafnium, nickel-titanium (NiTi or Nitinol), and the like. NiTi SMA alloys generally have superior mechanical properties to copper-based SMAs, but are also generally more expensive. The SMA actuators according to various embodiments of the disclosure may be made, for example but without limitation, from any of these aforementioned SMA materials.

Figure 3:
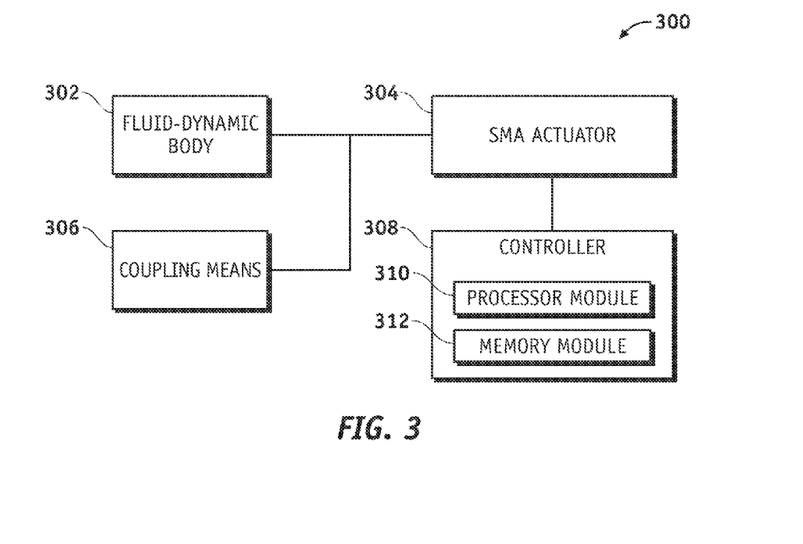
FIG. 3 is an illustration of an exemplary variable camber fluid-dynamic body system according to an embodiment of the disclosure.

FIG. 3 is an illustration of an exemplary variable camber fluid-dynamic body system 300 (system 300) according to an embodiment of the disclosure. The system 300 may comprise a fluid-dynamic body 302 (airfoil 302), a shape memory alloy (SMA) actuator 304, and a controller 308. The airfoil 302 and the SMA actuator 304 may be coupled to each other via various coupling means 306. The fluid-dynamic body 302, a variable camber airfoil 302, a variable camber fluid-dynamic body 302, and the airfoil 302 may used interchangeably in this document.

The airfoil 302 comprises a variable camber and as such is also referred to as the variable camber airfoil 302. The variable camber airfoil 302 is operable to configure a shape of a camber 414 (FIG. 4) to a first camber configuration using the SMA actuator 304 in response to a first control temperature. The variable camber airfoil 302 is further operable to configure a shape of the camber 414 (FIG. 4) to reshape the first camber configuration to a second camber configuration using the SMA actuator 304 in response to a second control temperature. In this manner, a camber profile of the variable camber airfoil 302 changes from a fixed camber profile prior to an actuation of the SMA actuator 304 to a variable camber profile after the actuation of the SMA actuator 304. The camber 414 (FIG. 4) of the variable camber airfoil 302 may be defined by a mean camber line 410 (FIG. 4), which is the curve that is halfway between an upper surface 420 (FIG. 4) and a lower surface 422 (FIG. 4) of the variable camber airfoil 302 (airfoil 400 in FIG. 4). As mentioned above, a change in camber of the variable camber airfoil 302/400 can change a stall speed of the aircraft 200.

Figure 4:
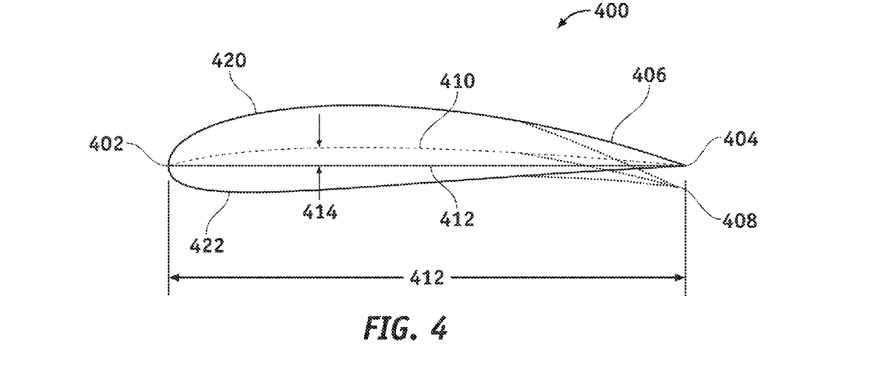
FIG. 4 is an illustration of an exemplary variable camber airfoil according to an embodiment of the disclosure.

The variable camber airfoil 302/400 may comprise a cross section of a lifting surface and/or a cross section of a control surface of a fluid-dynamic body. The control surface may comprise, for example but without limitation, a slat, an aileron, a tail, a rudder, an elevator, a flap, a spoiler, an elevon, and the like. The lift surface may comprise, for example but without limitation, a wing, a canard, a horizontal stabilizer, and the like.

The SMA actuator 304 is operable to vary a shape (i.e., bend, deflect, change shape) of a camber in response to heating and/or cooling. In this manner, the camber 414 can change shape to alter a flow over the variable camber airfoil 302/400. In one embodiment, the SMA actuator 304 is controlled via a passive control mechanism to control the shape of the camber 414 based on an ambient temperature corresponding to an altitude at a flight condition. In another embodiment, the controller 308 may include or be realized as a controller (connected to the aircraft systems), to facilitate controlling a deformation (i.e., changing the shape) of the camber 414 as explained in more detail below.

The SMA actuator 304 according to various embodiments of the disclosure may be made, for example but without limitation, from any of the SMA materials mentioned above. According to the various embodiments, the SMA actuator 304 comprises an SMA hinge 502/504/506/602/604 (FIGS. 5-6), an SMA actuated composite panel 700 (FIG. 7), a shape memory alloy panel, a shape memory alloy truss structure, and a truss SMA actuator 902 (FIG. 9) as explained in more detail below. However, the SMA actuator 304 is not limited to the SMA hinge 502/504/506/602/604, the SMA actuated composite panel 700, and the truss SMA actuator 902 and may also comprise other SMA structures operable to vary a shape of the camber 414.

Various coupling means 306 may comprise any coupling technology suitable for use by the system 300. The various coupling means 306 may comprise, for example but without limitation, gluing, welding, and the like.

The controller 308 may comprise, for example but without limitation, a processor module 310, a memory module 312, and the like. The controller 308 may be implemented as, for example but without limitation, a part of an aircraft system, a centralized aircraft processor, a subsystem computing module devoted to the variable camber airfoil 302, and the like.

The controller 308 is configured to thermally control the SMA actuator 304 to vary a shape of the camber 414 according to various operation conditions. The operation conditions may comprise, for example but without limitation, flight conditions, ground operations, and the like. The flight conditions may comprise, for example but without limitation, take off, cruise, approach, landing, and the like. The ground operations may comprise, for example but without limitation, air breaking after landing, and the like. The controller 308, may be located remotely from the SMA actuator 304, or may be coupled to the SMA actuator 304. The SMA actuator 304 is controllable by adjusting a temperature between martensite and austenite finish temperatures such that shapes in between the extreme actuated states can be selected and maintained using the controller 308.

In operation, the controller 308 may control the SMA actuator 304 by monitoring the temperature of the SMA actuators 304 and by heating and/or cooling at least a portion of the SMA actuator 304 as needed. The heating/cooling of the SMA actuator 304 may be provided by, for example but without limitation, the aircraft cooling/heating systems and the like. For example, a heater may utilize an electrical heater element and a controllable current source where a temperature is proportional to a current applied to the heater element. In this manner, the controller 308 determines a temperature based on a current flight condition, and provides heating/cooling to activate/deactivate the SMA actuator 304. This enables the controller 308 to vary the shape of the camber 414 in accordance with current flight conditions, e.g., whether an aircraft is approaching, landing, taking off or in cruise. The controller 308 may be used to optimize a shape of the camber 414 for noise, lift, drag, and the like.

In one embodiment, the controller 308 is configured to change temperature of the SMA actuators 304 non-uniformly. The controller 308 may vary temperatures of respective segments of the SMA actuator 304 separately from each other, wherein each of the temperatures is different from one another. In this manner, different regions of the SMA actuator 304 can be heated to different temperatures via the controller 308 to effect different levels of change in shape of the camber 414 in different regions of the variable camber airfoil 302. For example, different SMA actuators can be heated by different amounts to maintain a desired shape.

The processor module 310 comprises processing logic that is configured to carry out the functions, techniques, and processing tasks associated with the operation of the system 300. In particular, the processing logic is configured to support the system 300 described herein. For example, the processor module 310 may direct the SMA actuator 304 to vary a shape of the camber 414 based on various flight conditions.

The processor module 310 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 312 may comprise a data storage area with memory formatted to support the operation of the system 300. The memory module 312 is configured to store, maintain, and provide data as needed to support the functionality of the system 300. For example, the memory module 312 may store flight configuration data, control temperature data, and the like.

In practical embodiments, the memory module 312 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 312 may be coupled to the processor module 310 and configured to store, for example but without limitation, a database, and the like. Additionally, the memory module 312 may represent a dynamically updating database containing a table for updating the database, and the like. The memory module 312 may also store, a computer program that is executed by the processor module 310, an operating system, an application program, tentative data used in executing a program, and the like.

The memory module 312 may be coupled to the processor module 310 such that the processor module 310 can read information from and write information to the memory module 312. For example, the processor module 310 may access the memory module 312 to access an aircraft speed, a flight control surface position, an angle of attack, a Mach number, an altitude, and the like.

As an example, the processor module 310 and memory module 312 may reside in respective application specific integrated circuits (ASICs). The memory module 312 may also be integrated into the processor module 310. In an embodiment, the memory module 312 may comprise a cache memory for storing temporary variables or other intermediate information during execution of instructions to be executed by the processor module 310.

FIG. 4 is an illustration of an exemplary variable camber airfoil 400 (airfoil 400) according to an embodiment of the disclosure. The variable camber airfoil 400 may comprise a leading edge 402, a tailing edge 404, the upper surface 420, and the lower surface 422. The variable camber airfoil 400 comprises the SMA actuator 304 (FIG. 3). As explained in more detail below, the SMA actuator 304 may be coupled (e.g., via coupling means 306) in various ways to the variable camber airfoil 400. The SMA actuator 304 may configure the variable camber airfoil 400 into a first camber configuration 406 and a second camber configuration 408. The first camber configuration 406 may comprise, for example but without limitation, a quiescent SMA state, a martensitic SMA state, an austenitic SMA state, and the like, of the SMA actuator 304. The second camber configuration 408 may comprise, for example but without limitation, a quiescent state SMA state, a martensitic SMA state, an austenitic SMA state, and the like, of the SMA actuator 304.

The variable camber airfoil 400 may be characterized by the mean camber line 410 (camber line) and a chord line 412. The camber line 410 may comprise a curve halfway between the upper surface 420 and the lower upper surface 422 of the variable camber airfoil 400 characterizing an asymmetry between the upper surface 420 and the lower surface 422. The camber 414 of the variable camber airfoil 400 can be defined by a camber line 410. The camber 414 may comprise distances between the camber line 410 and the chord line 412 defining a shape of the camber line 410.

Figure 5:
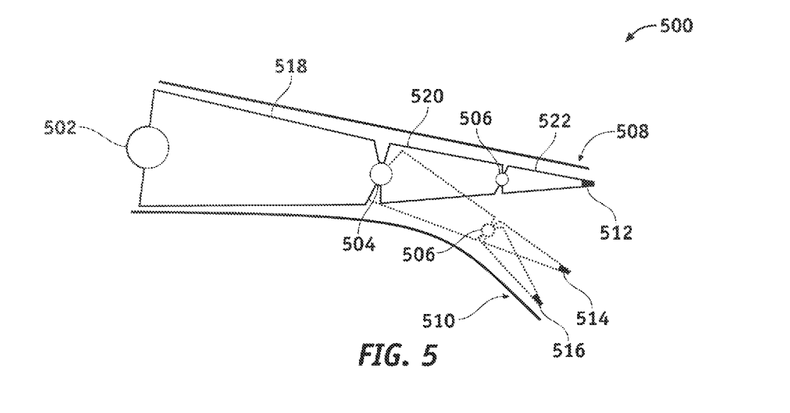
FIG. 5 is an illustration of an exemplary variable camber structure comprising a plurality of hinge shape memory alloy actuators showing camber profiles according to an embodiment of the disclosure.

FIG. 5 is an illustration of an exemplary variable camber structure 500 comprising a plurality of SMA hinges 502/504/506 showing camber profiles 508 and 510 (camber lines) according to an embodiment of the disclosure. The variable camber structure 500 is operable to couple to the fluid-dynamic body 302 (FIG. 3). The variable camber structure 500 comprises a first SMA hinge 502, a second SMA hinge 504, a third SMA hinge 506, a first aerodynamic structure 518, a second aerodynamic structure 520, and a third aerodynamic structure 522.

The first SMA hinge 502 is coupled to the first aerodynamic structure 518, and the second SMA hinge 504 is coupled to the first aerodynamic structure 518 and the second aerodynamic structure 520. The third SMA hinge 506 is coupled to the second aerodynamic structure 520 and the third aerodynamic structure 522. The first SMA hinge 502, the second SMA hinge 504, and the third SMA hinge 506 are each operable to activate (e.g., twist) in response to a first SMA activation control temperature, a second SMA activation control temperature, and a third SMA activation control temperature respectively. The first SMA hinge 502, the second SMA hinge 504, and the third SMA hinge 506 may be controlled individually or in combination. The first SMA activation control temperature, the second SMA activation control temperature, and the third SMA activation control temperature may be controlled individually (e.g., at separate individual temperatures) or in combination (e.g., two or more may have a temperature in common).

The variable camber structure 500 is operable to change a shape of the camber 414 (FIG. 4) and thus a shape of a first camber line 508 by reshaping from a first camber configuration 512 to a second camber configuration 516 in response to activation of the first SMA hinge 502, the second SMA hinge 504, and the third SMA hinge 506. The variable camber structure 500 comprises a first camber line 508 in the first camber configuration 512, and a second camber line 510 in the second camber configuration 516. The variable camber structure 500 is further operable to change to various shapes such as a third camber configuration 514 between the first camber configuration 512 and the second camber configuration 516.

Figure 6:
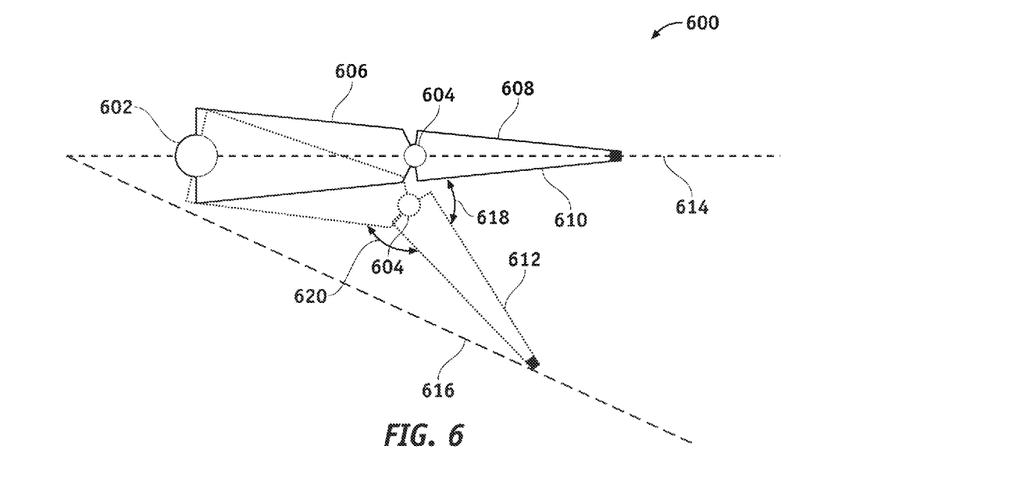
FIG. 6 is an illustration of an exemplary variable camber structure comprising a plurality of hinge shape memory alloy actuators showing chord lines according to an embodiment of the disclosure.

FIG. 6 is an illustration of an exemplary variable camber structure 600 comprising a plurality of shape memory alloy hinges 602/604 according to an embodiment of the disclosure. The variable camber structure 600 is operable to couple to the fluid-dynamic body 302 (FIG. 3). The variable camber structure 600 comprises a first SMA hinge 602, a second SMA hinge 604, a first aerodynamic structure 606, and a second aerodynamic structure 608.

The first SMA hinge 602 is coupled to the first aerodynamic structure 606, and the second SMA hinge 604 is coupled to the first aerodynamic structure 606 and the second aerodynamic structure 608. The first SMA hinge 602 may also be coupled to the fluid-dynamic body 302. The first SMA hinge 602 and the second SMA hinge 604 are each operable to activate (e.g., twist) in response to a first SMA activation control temperature and a second SMA activation control temperature respectively. The first SMA hinge 602 and the second SMA hinge 604 may be controlled individually or in combination. The first SMA activation control temperature and the second SMA activation control temperature may be controlled individually (e.g., at separate individual temperatures) or in combination (e.g., two or more may have a temperature in common).

The variable camber structure 600 is operable to change a shape of the camber 414 (FIG. 4) by reshaping from a first camber configuration 610 to a second camber configuration 612 in response to activation of the first SMA hinge 602 and the second SMA hinge 604. The first camber configuration 610 comprises the first aerodynamic structure 606 at a first angle 618 in relation to the second aerodynamic structure 608. The second camber configuration 612 comprises the first aerodynamic structure 606 at a second angle 620 in relation to the second aerodynamic structure 608. The variable camber structure 600 comprises a first chord line 614 in the first camber configuration 610, and a second chord line 616 in the second camber configuration 612.

In the embodiments shown in FIGS. 5-6, up to three SMA hinges are used in the variable camber structures 500 and 600. However, any number of the SMA hinges 502, 504, 506, 602, and 604 may be used. Furthermore, placing the SMA hinges 502, 504, 506, 602, and 604 in different joint locations (e.g., composite joint locations) enables efficient transfer of load between variable camber surfaces comprising the variable camber structures 500 and 600. The variable camber surfaces, may comprise, for example but without limitation, wing surfaces, control surfaces, the upper surface 420, the lower surface 422, and the like. The SMA hinges 502, 504, 506, 602, and 604 each may need to be carefully designed between composite panels of the variable camber surfaces so that actuation of the composite panels is efficiently enabled during a deformation process.

Figure 7:
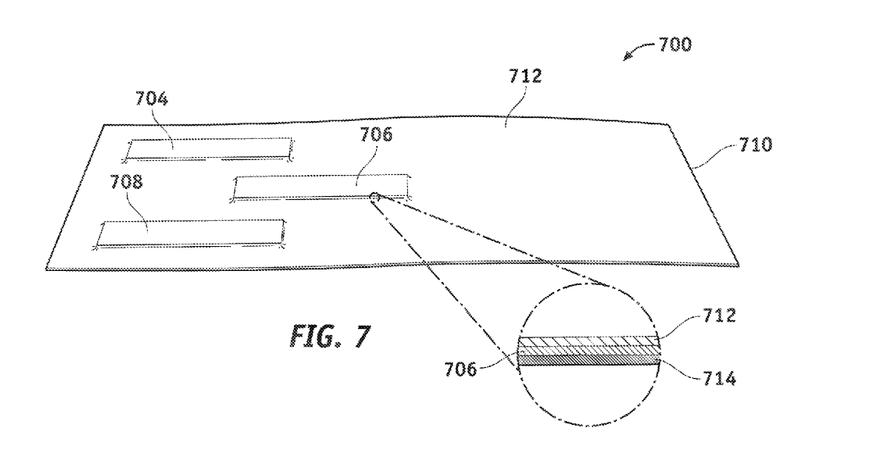
FIG. 7 is an illustration of an exemplary shape memory alloy actuated composite panel in a non-actuated state according to an embodiment of the disclosure.

FIG. 7 is an illustration of an exemplary shape memory alloy actuated composite panel 700 (SMA panel 700) in a non-actuated state 710 according to an embodiment of the disclosure. The SMA actuated composite panel 700 may comprise a first composite laminate layer 712 and a second composite laminate layer 714, and an SMA actuator 704/706/708 (shape memory alloy actuated panel) bonded between the first composite laminate layer 712 and the second composite laminate layer 714. The SMA actuator 704/706/708 may comprise, for example but without limitation, an SMA layer, an SMA rod, an SMA sheet, an SMA mesh, and the like.

Figure 8:
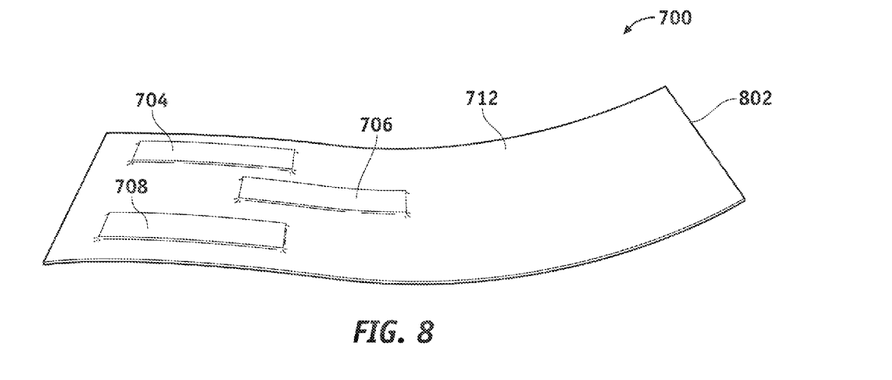
FIG. 8 is an illustration of an exemplary shape memory alloy actuated composite panel showing the shape memory alloy actuated composite panel of FIG. 7 in an actuated state according to an embodiment of the disclosure.

FIG. 8 is an illustration of the exemplary SMA actuated composite panel 700 of FIG. 7 in an actuated state 802 according to an embodiment of the disclosure. The SMA actuated composite panel 700 can be actuated to shape the camber 414 of the variable camber airfoil 400 (FIG. 4). In one embodiment, a composite skin of the variable camber airfoil 400 may be filled with layers of the SMA material 704/706/708. The SMA actuated composite panel 700 (SMA actuator 304) may be placed, for example but without limitation, between composite layups as a cutout style, a sandwich style, and the like, to achieve a morphing capability specifically where a shape change capability is desired for a final variable camber profile. For example, multiple plies of SMA foil can be placed in various locations of the variable camber airfoil 400 where larger deformation of surfaces comprising the upper surface 420 and the lower surface 422 is desired.

Figure 9:
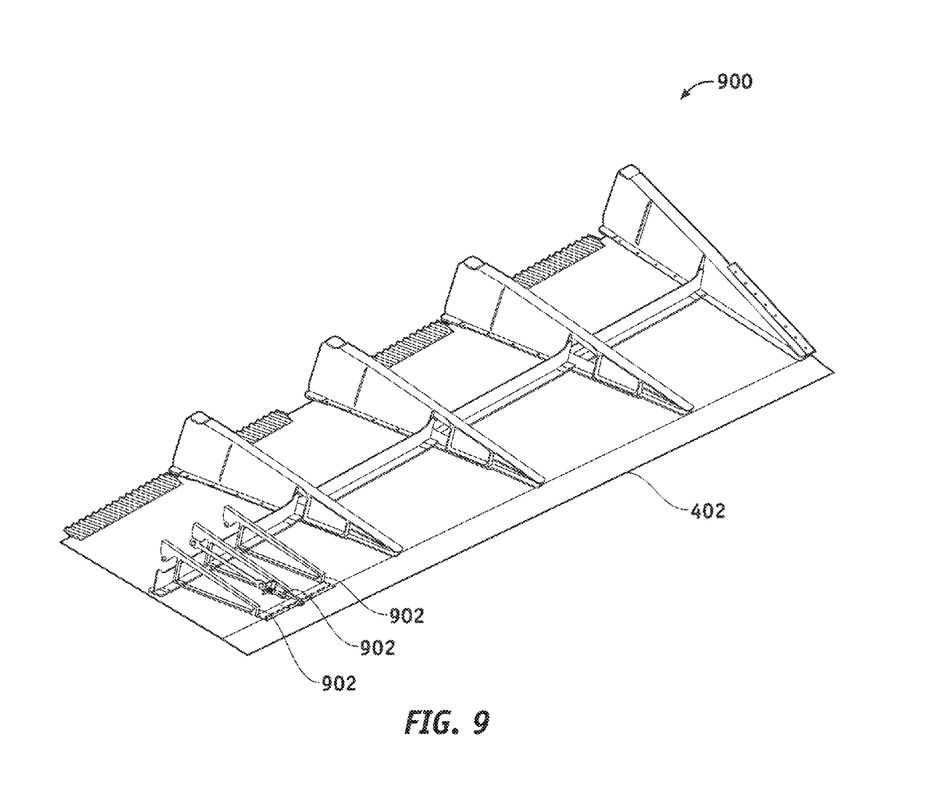
FIG. 9 is an illustration of an exemplary lifting surface assembly comprising a shape memory alloy truss actuator according to an embodiment of the disclosure.
Figure 10:
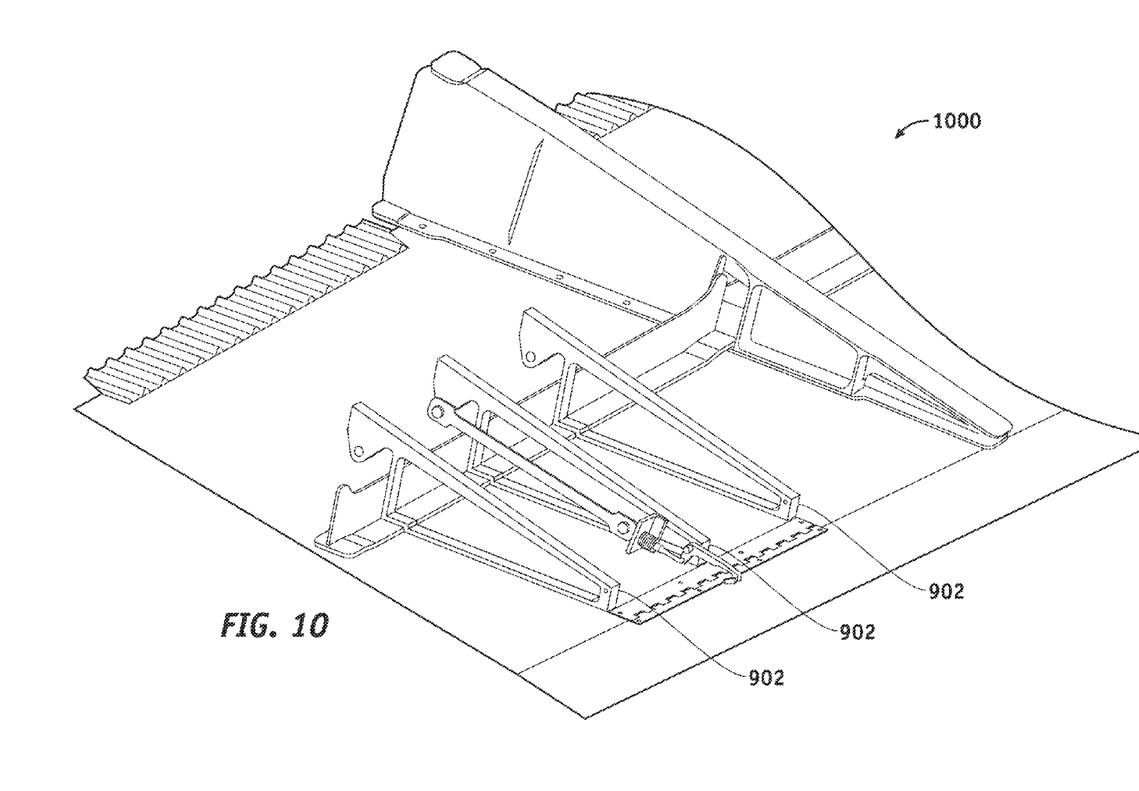
FIG. 10 is an illustration of an expanded view of the shape memory alloy truss actuator of FIG. 9 according to an embodiment of the disclosure.

FIG. 9 is an illustration of an exemplary lifting surface assembly 900 comprising the truss SMA actuator 902 (shape memory alloy truss structure) according to an embodiment of the disclosure. FIG. 10 is an illustration of an expanded view 1000 of the truss SMA actuator 902 of FIG. 9 according to an embodiment of the disclosure.

The lifting surface assembly 900 comprises the upper surface 420 (removed in FIG. 9 to show the truss SMA actuator 902), and the lower surface 422 of the variable camber airfoil 302/400. The truss SMA actuator 902 may be located, for example but without limitation, near a leading edge 402 as shown in FIG. 9, a trailing edge 404 (FIG. 4) of the variable camber airfoil 302/400, and the like. In the embodiment shown in FIG. 9, the truss SMA actuator 902 changes shape in response to a change in temperature, which bends the leading edge 402 (e.g., wing leading edge) by varying the camber 414 (FIG. 4). The truss SMA actuator 902 may be made thick or thin, longer or shorter depending on variable camber design criteria, and may be placed on any location suitable for operation of the system 300. Any number of the truss SMA actuator 902 may be used to shape the camber 414.

Using the truss SMA actuator 902, the variable camber airfoil 302/400 (FIGS. 3-4) is operable to change a shape of the camber 414 to reshape an initial camber configuration (e.g., first camber configuration 406 in FIG. 4) to a final variable camber configuration (e.g., second camber configuration 408 in FIG. 4) using the truss SMA actuator 902 in response to a first control temperature and a second control temperature respectively. In this manner, a camber profile of the variable camber airfoil 302 changes from an initial camber profile (e.g., first camber line 508 in FIG. 5) prior to an actuation of the truss SMA actuator 902 to a final variable camber profile (e.g., second camber line 510) after the actuation of the truss SMA actuator 902.

FIG. 10 is an illustration of an expanded view of the truss SMA actuator 902 of FIG. 9 according to an embodiment of the disclosure.

Figure 11:
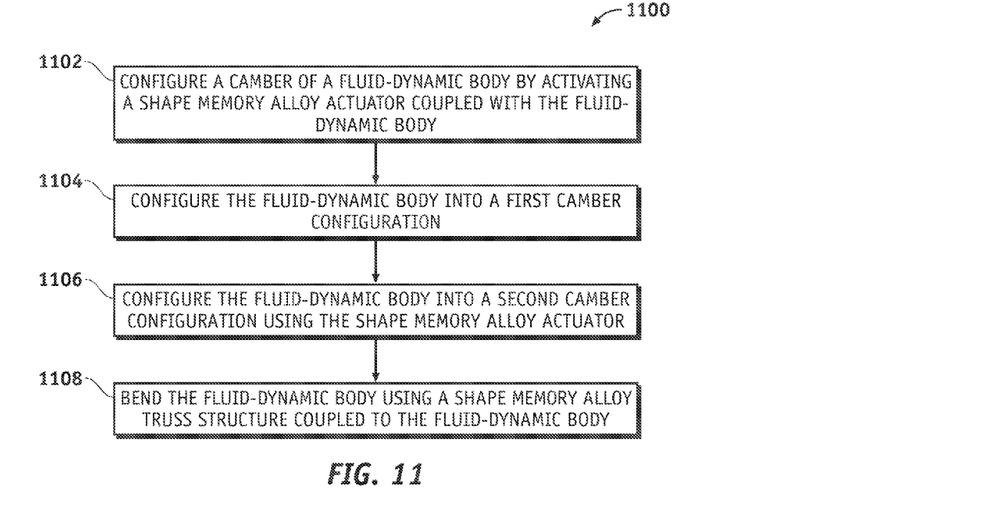
FIG. 11 is an illustration of an exemplary flowchart showing a fluid-dynamic body configuration process according to an embodiment of the disclosure.

FIG. 11 is an illustration of an exemplary flowchart showing a fluid-dynamic body configuration process 1100 (process 1100) according to an embodiment of the disclosure. The various tasks performed in connection with process 1100 may be performed mechanically, by software, hardware, firmware, computer-readable software, computer readable storage medium, or any combination thereof. It should be appreciated that process 1100 may include any number of additional or alternative tasks, the tasks shown in FIG. 11 need not be performed in the illustrated order, and the process 1100 may be incorporated into a more comprehensive procedure or process having additional functionality not described in detail herein.

For illustrative purposes, the following description of process 1100 may refer to elements mentioned above in connection with FIGS. 1-10. In practical embodiments, portions of the process 1100 may be performed by different elements of the system 300 such as: the fluid-dynamic body 302, the SMA actuator 304, the controller 308, etc. It should be appreciated that process 1100 may include any number of additional or alternative tasks, the tasks shown in FIG. 11 need not be performed in the illustrated order, and the process 1100 may be incorporated into a more comprehensive procedure or process having additional functionality not described in detail herein.

Process 1100 may begin by configuring a camber such as the camber 414 of a fluid-dynamic body such as the fluid-dynamic body 302 by activating a shape memory alloy actuator such as the SMA actuator 304 coupled with the fluid-dynamic body 302 (task 1102).

Process 1100 may continue by configuring the fluid-dynamic body 302 into a first camber configuration such as the first camber configuration 406 (task 1104).

Process 1100 may continue by configuring the fluid-dynamic body 302 into a second camber configuration such as the second camber configuration 408 using the SMA actuator 304 (task 1106).

Process 1100 may continue by bending the fluid-dynamic body 302 using a shape memory alloy truss structure such as the truss SMA actuator 902 coupled to the fluid-dynamic body 302 (task 1108).

Figure 12:
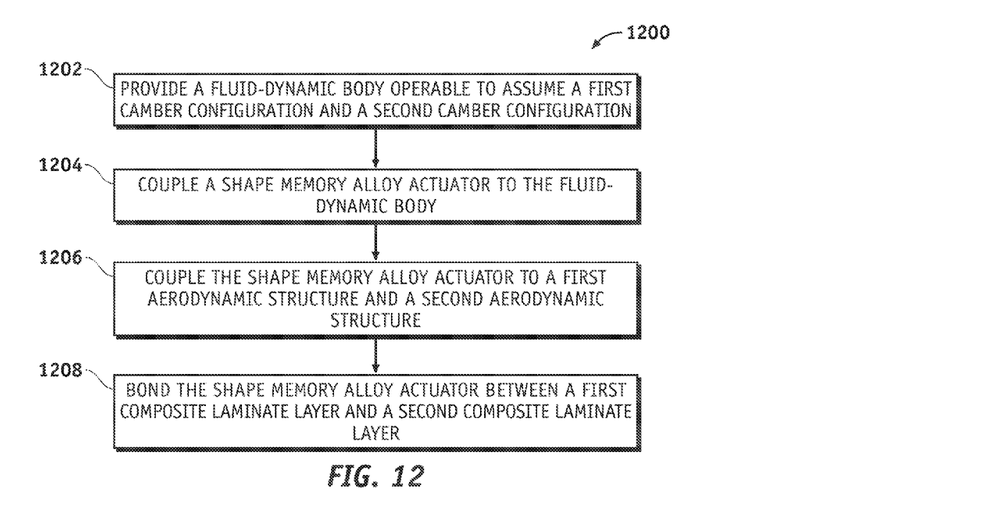
FIG. 12 is an illustration of an exemplary flowchart showing a process for providing a variable camber fluid-dynamic body system according to an embodiment of the disclosure.

FIG. 12 is an illustration of an exemplary flowchart showing a process 1200 for providing a variable camber fluid-dynamic body system such as the system 300 according to an embodiment of the disclosure. The various tasks performed in connection with process 1200 may be performed mechanically, by software, hardware, firmware, computer-readable software, computer readable storage medium, or any combination thereof. It should be appreciated that process 1200 may include any number of additional or alternative tasks, the tasks shown in FIG. 12 need not be performed in the illustrated order, and the process 1200 may be incorporated into a more comprehensive procedure or process having additional functionality not described in detail herein.

For illustrative purposes, the following description of process 1200 may refer to elements mentioned above in connection with FIGS. 1-10. In practical embodiments, portions of the process 1200 may be performed by different elements of the system 300 such as: the fluid-dynamic body 302, the SMA actuator 304, the controller 308, etc. It should be appreciated that process 1200 may include any number of additional or alternative tasks, the tasks shown in FIG. 12 need not be performed in the illustrated order, and the process 1200 may be incorporated into a more comprehensive procedure or process having additional functionality not described in detail herein.

Process 1200 may begin by providing a fluid-dynamic body such as the fluid-dynamic body 302 operable to assume a first camber configuration such as the first camber configuration 406 and a second camber configuration such as the second camber configuration 408 (task 1202). The fluid-dynamic body 302 may comprise, for example but without limitation, an airfoil, a wing, a fuselage, a strut, a winglet, an elevator, a rudder, an aileron, an elevon, and the like.

Process 1200 may continue by coupling a shape memory alloy actuator such as the SMA actuator 304 to the fluid-dynamic body 302 (task 1204). The shape memory alloy actuator is operable to configure the fluid-dynamic body 302 into the first camber configuration 406 in response to a first control temperature, and configure the fluid-dynamic body 302 into the second camber configuration 408 in response to a second control temperature. The SMA actuator 304 may comprise, the SMA hinge 502/504/506/602/604 (FIGS. 5-6), the SMA actuated composite panel 700 (FIG. 7), and the truss SMA actuator 902 (FIG. 9) as explained above.

Process 1200 may continue by coupling the SMA actuator 304 to a first aerodynamic structure such as the first aerodynamic structure 606 and a second aerodynamic structure such as the second aerodynamic structure 608 (task 1206).

Process 1200 may continue by bonding the SMA actuator 304 between a first composite laminate layer such as the first composite laminate layer 712 and a second composite laminate layer such as the second composite laminate layer 714 (task 1208).

In this manner, the embodiments of the disclosure provide various means for configuring a camber of a fluid-dynamic body using SMA actuators.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processor module 310 to cause the processor module 310 to perform specified operations. Such instructions, generally referred to as "computer program code" or "program code" (which may be grouped in the form of computer programs or other groupings), when executed, enable power utilization scheduling methods of the system 700.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 2-10 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for changing a camber of an airfoil, the method comprising:
    activating a shape memory alloy (SMA) hinge pivotally coupling a variable camber structure to a fluid-dynamic body by applying a first temperature to the SMA hinge;
    pivoting the variable camber structure about a hinge axis of the SMA hinge by action of the SMA hinge in response to the first temperature, wherein the SMA hinge is a first SMA hinge, and the variable camber structure comprises a first aerodynamic structure and a second aerodynamic structure pivotally coupled to the first aerodynamic structure along a chordwise direction using a second shape memory alloy (SMA) hinge;
    activating the second SMA hinge to pivot the second aerodynamic structure about a hinge axis of the second SME hinge, wherein the first aerodynamic structure comprises a first fluid-dynamic surface fixed to the first aerodynamic structure, and the second aerodynamic structure comprises a second fluid-dynamic surface fixed to the second aerodynamic structure and separate from the first fluid-dynamic surface;
    heating the first SMA hinge to the first temperature;
    heating the second SMA hinge to a second temperature different from the first temperature;
    operating the first SMA hinge between at least two fluid-dynamic camber line positions in a repeatable manner; and
    operating the second SMA hinge between at least two fluid-dynamic camber line positions in a repeatable manner independent from the first SMA hinge.

2. The method according to claim 1, further comprising activating the second SMA hinge by heating the second SMA hinge.

3. The method according to claim 1, further comprising activating the second SMA hinge by cooling the second SMA hinge.

4. The method according to claim 1, wherein the fluid-dynamic body comprises a wing and wherein the variable camber structure is coupled at a trailing edge of the wing, the method further comprising:
    increasing a camber of the wing by pivoting the variable camber structure in a first direction in response to the first temperature; and
    decreasing the camber of the wing by pivoting the variable camber structure in a second direction opposite the first direction in response to a second temperature.

5. A variable camber fluid-dynamic body system for an aircraft, the system comprising:
    a wing;

a shape memory alloy hinge pivotally coupled to the wing;
an aircraft control surface separate from and coupled to the aircraft wing by the shape memory alloy hinge disposed between the aircraft control surface and the aircraft wing, the aircraft control surface operable to pivot relative to the aircraft wing at the shape memory alloy hinge in response to heating or cooling of the shape memory alloy hinge, wherein the shape memory alloy hinge is a first shape memory alloy (SMA) hinge, and the aircraft control surface comprises a first aerodynamic structure and a second aerodynamic structure pivotally coupled along a chordwise direction using a second shape memory alloy (SMA) hinge, wherein the first aerodynamic structure comprises a first fluid-dynamic surface fixed to the first aerodynamic structure, and the second aerodynamic structure comprises a second fluid-dynamic surface fixed to the second aerodynamic structure and separate from the first fluid-dynamic surface; and
a controller operable to:
apply a first temperature to the first SMA hinge to pivot the first aerodynamic structure about the first SMA hinge;
apply a second temperature different from the first temperature to the second SMA hinge to pivot the second aerodynamic structure about the second SMA hinge;
operate the first SMA hinge between at least two fluid-dynamic camber line positions in a repeatable manner; and
operate the second SMA hinge between at least two fluid-dynamic camber line positions in a repeatable manner independent from the first SMA hinge.

6. The variable camber fluid-dynamic body system according to claim 5, wherein the aircraft control surface is selected from the group consisting of: a flap, a slat, a spoiler, an elevator, a rudder, an aileron, and an elevon.

7. The method according to claim 1, further comprising activating the second SMA hinge in response to a second temperature different from the first temperature.

8. The method according to claim 1, wherein the variable camber structure is coupled by separate coupling means to the SMA hinge.

9. The variable camber fluid-dynamic body system according to claim 5, further comprising a controller configured to change a temperature of the shape memory alloy hinge.

10. The variable camber fluid-dynamic body system according to claim 5, wherein the aircraft control surface is coupled by separate coupling means to the shape memory alloy hinge.

11. The variable camber fluid-dynamic body system according to claim 5, wherein the controller is further configured to non-uniformly change a temperature of the first shape memory alloy hinge and the second shape memory alloy hinge.

12. A variable camber fluid-dynamic body system, comprising:
a variable camber structure coupled to an airfoil, the variable camber structure comprising:
a first aerodynamic structure, wherein the first aerodynamic structure comprises a first fluid-dynamic surface fixed to the first aerodynamic structure;
a second aerodynamic structure pivotally coupled to the first aerodynamic structure along a chordwise direction of the airfoil, wherein the second aerodynamic structure comprises a second fluid-dynamic surface fixed to the second aerodynamic structure and separate from the first fluid-dynamic surface;
a first shape memory alloy (SMA) hinge coupled to the first aerodynamic structure pivotally coupling the first aerodynamic structure to the airfoil;
a second shape memory alloy (SMA) hinge pivotally coupling the first aerodynamic structure to the second aerodynamic structure; and
a controller operable to:
apply a first temperature to the first SMA hinge to pivot the first aerodynamic structure about the first SMA hinge;
apply a second temperature different from the first temperature to the second SMA hinge to pivot the second aerodynamic structure about the second SMA hinge;
operate the first SMA hinge between at least two fluid-dynamic camber line positions in a repeatable manner; and
operate the second SMA hinge between at least two fluid-dynamic camber line positions in a repeatable manner independent from the first SMA hinge.

13. The system according to claim 12, wherein the controller is further operable to heat at least one of the first SMA hinge and the second SMA hinge to cause the first aerodynamic structure or the second aerodynamic structure to pivot about the first SMA hinge or the second SMA hinge, respectively.

14. The system according to claim 12, wherein the controller is further operable to heat the first SMA hinge independently of the second SMA hinge.

15. The system according to claim 12, wherein the variable camber structure is a control surface coupled to a wing, a canard, or a horizontal or vertical stabilizer of an aircraft.

16. The system of claim 12, wherein the variable camber structure is coupled by separate coupling means to the airfoil.

17. The method of claim 1, wherein the variable camber structure comprises a skin attached non-slideably thereto.

18. The method of claim 1, further comprising heating the second SMA hinge to pivot the second aerodynamic structure about the second SMA hinge in response to the second temperature different from the first temperature and independent from activating the first aerodynamic structure.

19. The method of claim 1, further comprising:
configuring the first SMA hinge between takeoff, cruise, approach, and landing camber line positions in a repeatable manner; and
configuring the second SMA hinge between takeoff, cruise, approach, and landing camber line positions in a repeatable manner independent from the first SMA hinge.

20. The method of claim 1, further comprising optimizing a shape of a camber of the variable camber structure by:
configuring camber line positions of the first SMA hinge in a repeatable manner; and
configuring camber line positions of the second SMA hinge in a repeatable manner independent from the first SMA hinge.

* * * * *